United States Patent
Wang et al.

(10) Patent No.: US 11,983,850 B2
(45) Date of Patent: May 14, 2024

(54) IMAGE PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yi Wang, Shenzhen (CN); Xin Tao, Shenzhen (CN); Jiaya Jia, Shenzhen (CN); Yuwing Tai, Shenzhen (CN); Xiaoyong Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 370 days.

(21) Appl. No.: 17/372,311

(22) Filed: Jul. 9, 2021

(65) Prior Publication Data
US 2021/0334942 A1    Oct. 28, 2021

Related U.S. Application Data

(63) Continuation of application No. PCT/CN2020/074990, filed on Feb. 13, 2020.

(30) Foreign Application Priority Data

Mar. 6, 2019    (CN) .......................... 201910168409.7

(51) Int. Cl.
*G06T 5/00*    (2006.01)
*G06N 3/08*    (2023.01)
(Continued)

(52) U.S. Cl.
CPC ............... *G06T 5/005* (2013.01); *G06N 3/08* (2013.01); *G06T 5/50* (2013.01); *G06T 11/60* (2013.01); *G06T 2207/20081* (2013.01)

(58) Field of Classification Search
CPC . G06T 5/005; G06T 5/50; G06T 11/60; G06T 2207/20081; G06N 3/08
See application file for complete search history.

(56) References Cited

U.S. PATENT DOCUMENTS

2008/0238942 A1* 10/2008 Sun .......................... G06T 11/60
345/634

FOREIGN PATENT DOCUMENTS

| CN | 109191402 A | 1/2019 |
| CN | 109377448 A | 2/2019 |

(Continued)

OTHER PUBLICATIONS

Wu, Xian, et al. "Deep portrait image completion and extrapolation." IEEE Transactions on Image Processing 29 (2018): 2344-2355 (Year: 2018).*

(Continued)

*Primary Examiner* — Bobbak Safaipour
*Assistant Examiner* — Jongbong Nah
(74) *Attorney, Agent, or Firm* — ANOVA LAW GROUP, PLLC

(57) ABSTRACT

This application discloses an image processing method, device, and apparatus, and a storage medium. The method is performed by a computing device, the method including: receiving an input image; determining a context feature of the input image; determining a first feature set and a second feature set according to the context feature and based on a size of a target image and a location of the input image in the target image; adjusting the second feature set according to a first feature statistic of the first feature set, to obtain an adjusted second feature set; and generating the target image based on the adjusted second feature set and the first feature set.

20 Claims, 8 Drawing Sheets

(51) Int. Cl.
  *G06T 5/50* (2006.01)
  *G06T 11/60* (2006.01)

(56) References Cited

FOREIGN PATENT DOCUMENTS

| CN | 109816615 A | | 5/2019 | |
|---|---|---|---|---|
| CN | 109377448 B | * | 5/2021 | ............. G06T 5/005 |

OTHER PUBLICATIONS

Huang, Xun, and Serge Belongie. "Arbitrary style transfer in real-time with adaptive instance normalization." Proceedings of the IEEE international conference on computer vision. 2017 (Year: 2017).*

The European Patent Office (EPO) The Extended European Search Report for 20767229.6 dated Mar. 30, 2022 9 Pages.

Xian Wu et al., "Deep Portrait Image Completion and Extrapolation," IEEE Transactions on Image Processing, vol. 29, Aug. 23, 2018, pp. 2344-2355. 12 pages.

Huang Xun et al., "Arbitrary Style Transfer in Real-Time with Adaptive Instance Normalization," 2017 IEEE International Conference on Computer Vision (ICCV), IEEE, Oct. 22, 2017, pp. 1510-1519. 10 pages.

Dmitry Ulyanov et al., "Instance Normalization: The Missing Ingredient for Fast Stylization," arxiv.org, Cornell University Library, 201 Olin Library Cornell University Ithaca, NY 14853, arXiv:1607.08022v1, Jul. 27, 2016. 6 pages.

Mark Sabini et al., "Painting Outside the Box: Image Outpainting with GANs," arxiv.org, Cornell University Library, 201 Olin Library Cornell University Ithaca, NY 14853, arXiv:1808.08483v1, Aug. 25, 2018. 5 pages.

Jiahui Yu et al., "Generative Image Inpainting with Contextual Attention," arxiv.org, Cornell University Library, 201 Olin Library Cornell University Ithaca, NY 14853, arXiv:1801.07892v1, Jan. 24, 2018. 15 pages.

The World Intellectual Property Organization (WIPO) International Search Report for PCT/CN2020/074990 dated May 9, 2020 6 Pages (including translation).

* cited by examiner

Add a picture

Partial image

Size of a
target image:  Upper ☐ cm

Down ☐ cm

Left ☐ cm

Right ☐ cm

Target image

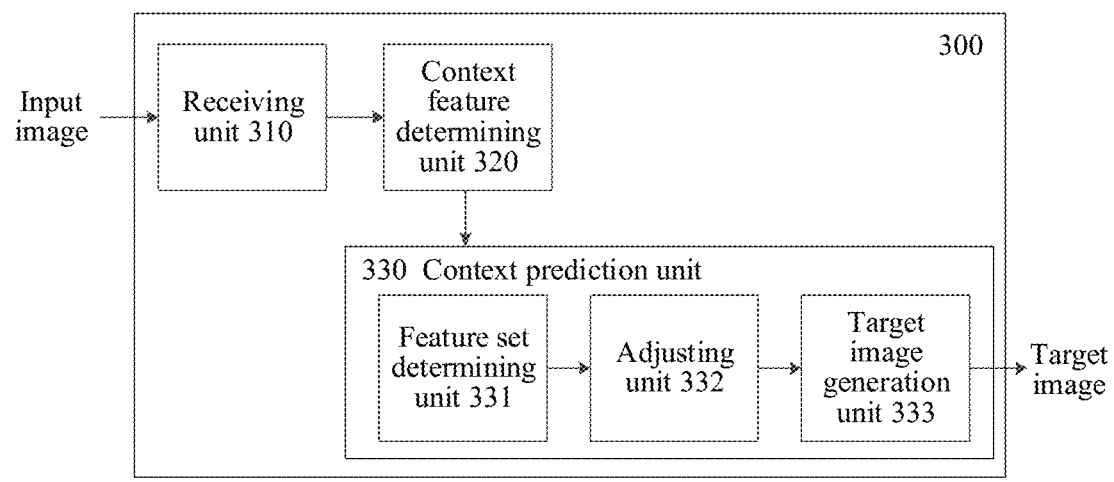
FIG. 3
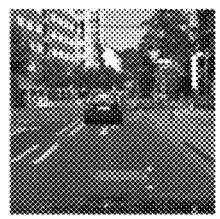 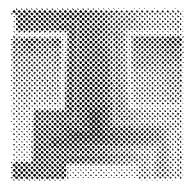
FIG. 4A    FIG. 4B
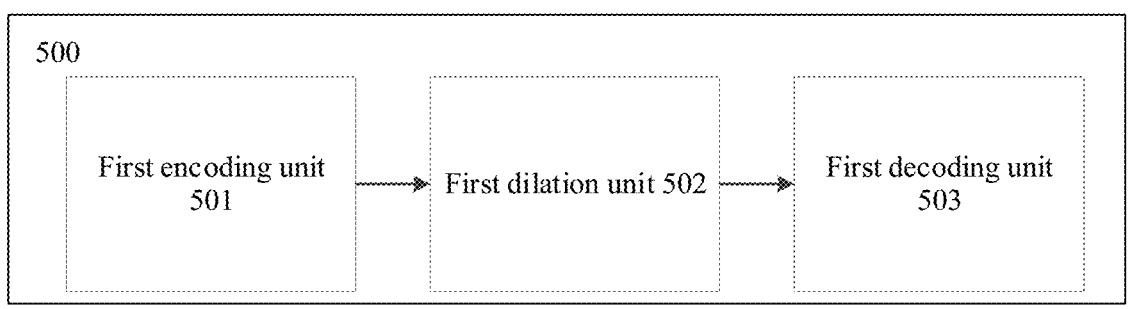
FIG. 5

FIG. 8B                              FIG. 8C

Input            Effect of the related art       Effect of this application

Input            Effect of the related art       Effect of this application

Input      Effect of the related art      Effect of this application

Input      Effect of the related art      Effect of this application

IMAGE PROCESSING METHOD AND APPARATUS, DEVICE, AND STORAGE MEDIUM

RELATED APPLICATIONS

This application is a continuation application of PCT Application No. PCT/CN2020/074990 entitled "IMAGE PROCESSING METHOD, DEVICE AND APPARATUS, AND STORAGE MEDIUM" and filed on Feb. 13, 2020, which claims priority to Chinese Patent Application No. 201910168409.7, entitled "IMAGE PROCESSING METHOD, APPARATUS, AND DEVICE, AND STORAGE MEDIUM" and filed with the China National Intellectual Property Administration on Mar. 6, 2019. The two applications are incorporated herein by reference in their entirety.

FIELD OF THE TECHNOLOGY

This application relates to the field of image processing, and in particular, to an image processing method, device, and apparatus, and a storage medium.

BACKGROUND OF THE DISCLOSURE

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science that attempts to understand essence of intelligence and produces a new intelligent machine that can react in a manner similar to human intelligence. AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Image inpainting is an image editing technology of filling an image specified region with reasonable elements. For example, a reasonable prediction may be made for visual content outside an image boundary based on a given image. In other words, complete image content is generated according to partial image information. However, an obtained inpainted image has poor consistency with the known partial image in terms of semantic information and texture.

SUMMARY

An objective of this application is to provide an image processing method, device, and apparatus, and a storage medium. According to the method provided in this application, semantic expansion may be performed on a region outside a boundary of a partial image based on information about the partial image, and an image inpainting effect with a real semantic value, a consistent structure, and a more real texture can be obtained.

According to an aspect of this application, an image processing method is provided, performed by a computing device, the method including: the method including: receiving an input image; determining a context feature of the input image; determining a first feature set and a second feature set according to the context feature and based on a size of a target image and a location of the input image in the target image; adjusting the second feature set according to a first feature statistic of the first feature set, to obtain an adjusted second feature set; and generating the target image based on the adjusted second feature set and the first feature set.

According to another aspect of this application, an image processing apparatus is further provided, the apparatus including a receiving unit, configured to receive an input image; a context feature determining unit, configured to determine a context feature of the input image; a feature set determining unit, configured to determine a first feature set and a second feature set according to the context feature and based on a size of a target image and a location of the input image in the target image; an adjusting unit, configured to adjust the second feature set according to a first feature statistic of the first feature set, to obtain an adjusted second feature set; and a target image generation unit, configured to generate the target image based on the adjusted second feature set and the first feature set.

According to another aspect of this application, a computing device for image processing is further provided, the computing device including a memory and a processor, the memory storing instructions, the instructions, when executed by the processor, causing the processor to perform the foregoing method.

According to another aspect of this application, a non-transitory computer-readable storage medium is further provided, storing computer-readable instructions, the computer-readable instructions, when executed by a processor, causing the processor to perform the foregoing method.

According to the image processing method, device, and apparatus, and the storage medium provided in this application, partial image information can be inpainted to obtain complete image information. In embodiments consistent with the present disclosure, values of elements in a feature set for representing an unknown region are adjusted by using statistic information of a feature set for representing a known region, and a statistic of the known region can be transferred to the unknown region, so that content of a predicted image generated by using the method according to this application can exceed one-way constraint of information about a known image closest to the predicted image, and color/texture consistency between the known region and the unknown region is enhanced. In addition, in embodiments consistent with the present disclosure a context feature of a partial image is directly extracted, unnecessary prior information will not be introduced during image inpainting, and the context feature can be determined completely based on information about the inputted partial image. Embodiments consistent with the present disclosure may generate an inpainted image that is more consistent with the inputted partial image in terms of structure, semantics, and texture.

BRIEF DESCRIPTION OF THE DRAWINGS

To describe the technical solutions in embodiments of this application more clearly, the following briefly describes accompanying drawings required for describing the embodiments. Apparently, the accompanying drawings in the following description show merely some embodiments of this application, and a person of ordinary skill in the art can still derive other drawings from these accompanying drawings without creative efforts. The following accompanying drawings are not deliberately drawn to scale according to the actual size, and a focus is demonstrating the main idea of this application.

FIG. 3 is a schematic diagram of an image processing apparatus according to an embodiment of this application.

FIG. 4A and FIG. 4B are examples of an input image according to an embodiment of this application.

FIG. 5 is a structure of a feature extended network according to an embodiment of this application.

FIG. 8B to FIG. 8J are effect diagrams of an image processing method according to this application.

DESCRIPTION OF EMBODIMENTS

To make the objectives, technical solutions, and advantages of the embodiments of this application more comprehensible, the following clearly and completely describes the technical solutions in the embodiments of this application with reference to the accompanying drawings in the embodiments of this application. Apparently, the described embodiments are a part rather than all of the embodiments of this application. All other embodiments obtained by a person of ordinary skill in the art based on the embodiments of this application without creative efforts shall fall within the protection scope of this application.

Unless otherwise defined, a technical term or a scientific term used in this application is to have a general meaning understood by a person of ordinary skill in the art of this application. The "first", the "second", and similar terms used in this application do not indicate any order, quantity or significance, but are used to only distinguish different components. Similarly, "include", "including", or similar terms mean that elements or items appearing before the term cover elements or items listed after the term and their equivalents, but do not exclude other elements or items. "Connection", "link" or the like is not limited to a physical or mechanical connection, but may include an electrical connection or a signal connection, whether directly or indirectly.

Embodiments of the present disclosure provide an improved image inpainting method, to generate images with more complete semantic information and stronger texture consistency based on partial image information.

Figure 1A:
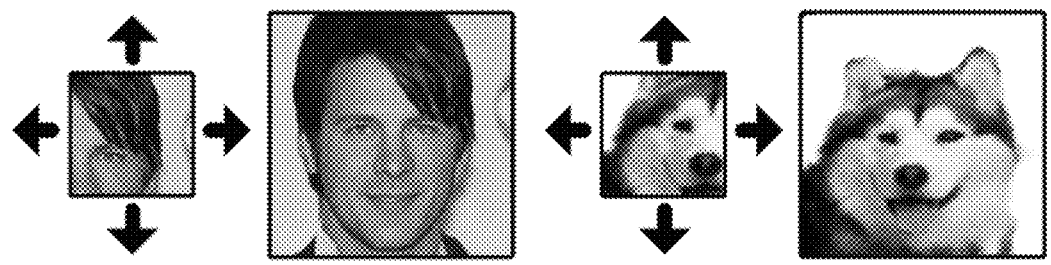
FIG. 1A and FIG. 1B are examples of performing image processing based on a partial image.
Figure 1B:
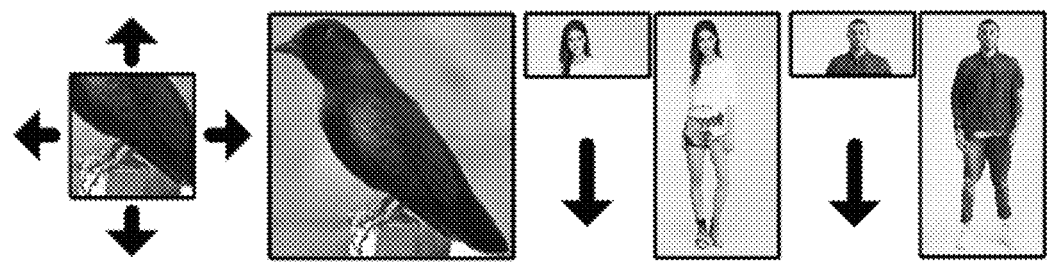

FIG. 1A and FIG. 1B are examples of performing image processing based on a partial image. As shown in figure, an image of a human or animal may be inpainted based on information about a partial face, body, or the like by using an image inpainting algorithm, to obtain a complete inpainted image. One part of the complete inpainted image is a known partial image, and the other part is a predicted image obtained by performing prediction on the partial image.

It may be understood that, because the predicted image is generated based on the partial image, the predicted image is not uniquely determined. An effect of image inpainting can be considered to be good provided that semantic information of the predicted image can be real and texture information is similar to that of the partial image.

For example, as shown in FIG. 1A, an image of a partial human face or animal face may be inpainted, to generate an image of a complete human portrait or animal face.

In another embodiment, for three examples in FIG. 1B, a complete body of an animal or a human may be obtained through partial body information inpainting. It can be seen from FIG. 1B that inpainted bird information includes semantic information that is not contained in original partial images such as a head, a mouth, and a tail, and texture information of a body part of the bird or a background part generated through image inpainting also has high consistency with corresponding texture information in the partial image.

Similarly, for the example of human body inpainting in FIG. 1B, although the partial image only includes information about a head and shoulders of the human, a complete human body image that is consistent with partial information texture may be generated by using an image processing algorithm provided in this application.

A person skilled in the art may understand that, for image inpainting, there is no need to limit content information of the partial image for generating a complete image. The partial image may have clear semantic information, or may be a texture image. A person skilled in the art may adjust a parameter of the image inpainting algorithm according to an actual situation, so that the image inpainting algorithm can be applicable to image inpainting with different semantics.

Figure 2A:
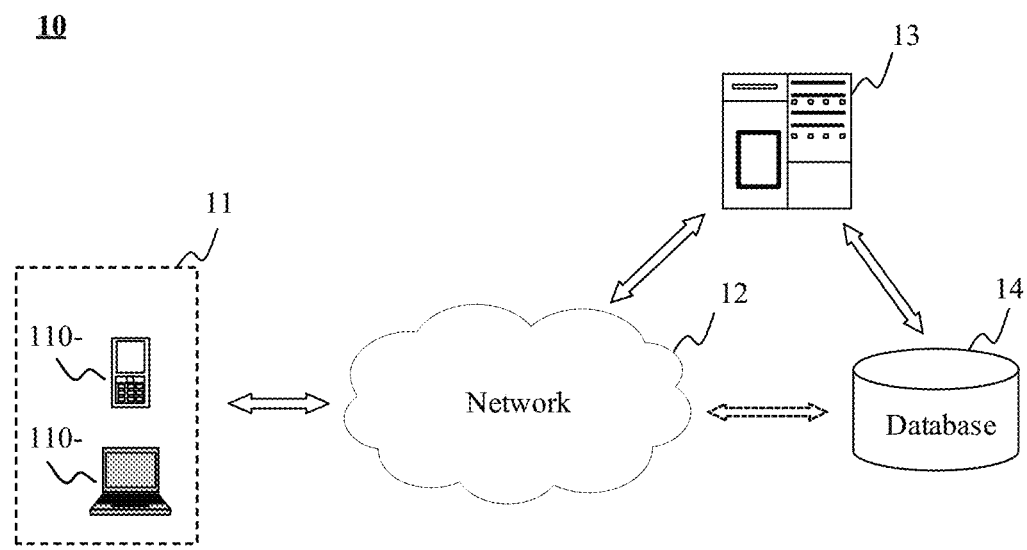
FIG. 2A is a scenario diagram of an image processing system according to an embodiment of this application.

FIG. 2A is a scenario diagram of an image processing system according to this application. As shown in FIG. 2A, the image processing system 100 may include one or more user terminals 110, one or more networks 120, one or more server devices 130, and one or more databases 140.

In some embodiments, the user terminal 110 may include, but is not limited to, a computer 110-1, a mobile phone 120-1, or the like. It may be understood that the user terminal may be any other type of electronic device and includes, but is not limited to, a notebook, a tablet computer, a smart home device, a wearable device, or the like. According to this application, the user terminal may be configured to receive information about an original partial image for image inpainting as an input image. In some embodiments, the user terminal may be configured to receive an input image and perform image inpainting on the input image by using a processing unit of the user terminal. For example, the user terminal may perform an image inpainting algorithm on the input image by using an algorithm and data stored in a built-in memory. In some implementations, the user terminal may perform image inpainting by using a built-in application program. In some other implementations, the user terminal may perform image inpainting by invoking an image inpainting program stored in an external database.

In some other embodiments, the user terminal may be configured to receive an input image, and send the input image to the server device 130 through the network 120, and the server device 130 performs image processing, or image inpainting. In some implementations, the server device 130 may perform image inpainting by using a built-in application program. In some other implementations, the server device 130 may perform image inpainting by invoking an image inpainting program stored in an external database.

The network 120 may be a single network, or a combination of a plurality of different networks. For example, the network 120 may include, but is not limited to, one or a combination of some of a local area network, a wide area network, a public network, a private network, or the like.

The server device 130 may be an independent server device, or a server device group, and server devices in the group are connected through a wired or wireless network. A server device group may be centralized, for example, the server device may be a data center. The server device 130 may be local or remote.

The database 140 may generally refer to a device with a storage function. The database 140 is mainly configured to store data received from the user terminal and data outputted, generated, and used by the server device 130 in work. The database 140 may be local or remote. The database 140 may be various memories, for example, a random access memory (RAM), and a read-only memory (ROM). The storage devices mentioned above are just examples, and the storage devices that can be used in the system are not limited to these.

The database 140 may be connected to or communicate with the network 120, or may be directly connected to or communicate with the server device 130 or a part of the server device, or a combination of the two manners.

According to the image processing system provided in FIG. 2A, a to-be-inpainted input image may be received by the user terminal. For example, a user may capture an image by using a camera installed on the user terminal as an input image. In another example, the user may download a picture through the network as an input image or read an input image from a storage unit in user equipment. Image inpainting may be performed on the determined input image by using a processing unit of the user terminal, or the user terminal transmits the to-be-inpainted input image to the server device through the network 120, and then the server device performs image inpainting. The following describes a process of the image processing method in detail, in this application, the image processing may include, but is not limited to image inpainting.

FIG. 2B to FIG. 2E are graphical user interfaces of application of an image processing method according to an embodiment of this application.

Figure 2B:
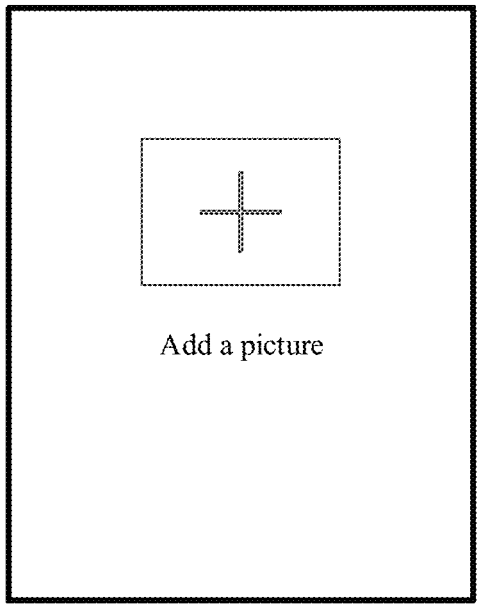
FIG. 2B to FIG. 2E are graphical user interfaces of application of an image processing method according to an embodiment of this application.
Figure 2C:
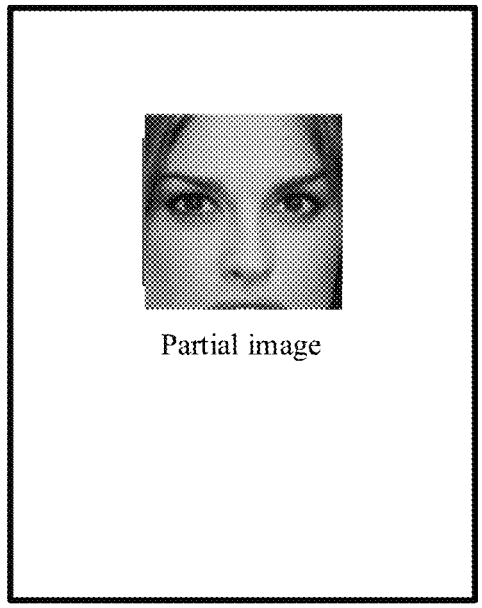

As described above, the image inpainting method provided in this application may be performed by the user terminal. As shown in FIG. 2B, the user may select a partial image for inpainting by using a program embedded in the user terminal. For example, a user may click a "cross" symbol of "add a picture" in FIG. 2B, and input a to-be-inpainted input image. For example, the user may select a to-be-inpainted input image from a local storage unit or acquire a to-be-inpainted input image by using an image acquisition device of the user terminal. FIG. 2C shows an effect of an graphical user interface after a user inputs a to-be-inpainted input image.

Figure 2D:
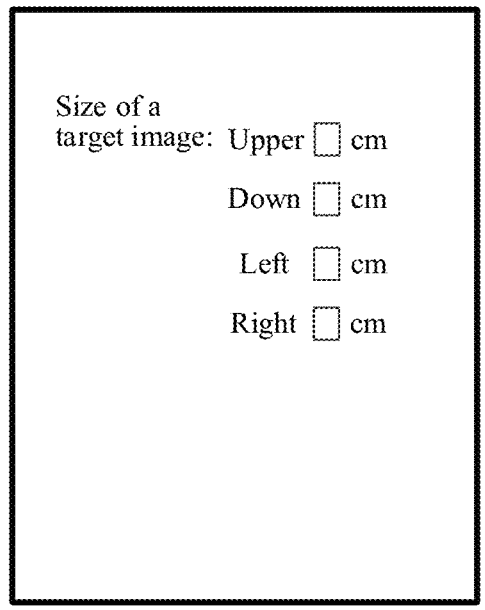

In some embodiments, the user may further input a target image, that is, a size of an image obtained after being inpainted. As shown in FIG. 2D, the user may input four parameters of "upper", "down", "left", and "right", to determine a size of the target image. The four parameters respectively represent a distance between an upper edge of the input image and an upper edge of the target image, a distance between a low edge of the input image and a low edge of the target image, a distance between a left edge of the input image and a left edge of the target image, and a distance between a right edge of the input image and a right edge of the target image.

Figure 2E:
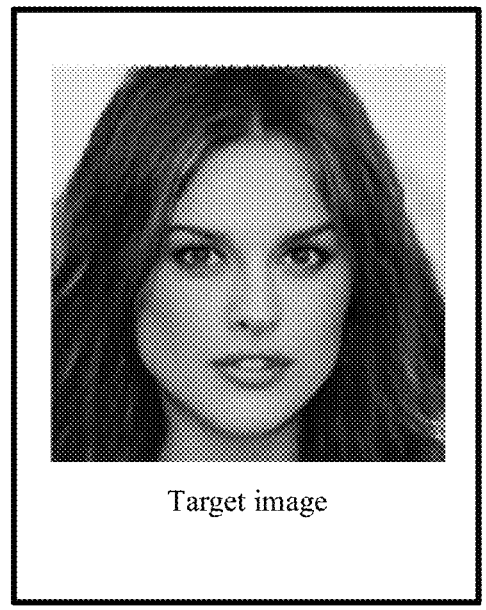

As described above, the image inpainting process may be performed by using the user terminal. Alternatively, an input image may be sent to the server device through the network, and the server device performs the image inpainting process. FIG. 2E is an effect diagram of a target image obtained by using the method according to an embodiment of this application. The image shown in FIG. 2E is generated according to the partial image shown in FIG. 2C, and the image has texture information consistent with that of the partial image and more complete semantic information.

A person skilled in the art may understand that, FIG. 2B to FIG. 2E only show graphical user interfaces for implementing the image inpainting method according to this application. In fact, a person skilled in the art may inpaint a partial image in response to a request of a user in any manner. This application is not limited thereto.

FIG. 3 is a schematic diagram of an image processing apparatus according to this application. The image inpainting apparatus shown in FIG. 3 may be implemented as the user terminal or the server device shown in FIG. 2A.

The image inpainting apparatus 300 may include a receiving unit 310, a context feature determining unit 320, and a context prediction unit 330. The context prediction unit 330 is configured to perform prediction according to a context feature determined by the context feature determining unit, to generate a target image. As shown in FIG. 3, the context prediction unit may further include a feature set determining unit 331, an adjusting unit 332, and a target image generation unit 333. Although not clearly shown in FIG. 3, a person skilled in the art may understand that the feature set determining unit 331, the adjusting unit 332, and the target image generation unit 333 shown in FIG. 3 may be set into an independent unit in accordance with the principle of this application, or may be set into an integrated module.

The receiving unit 310 may be configured to receive an input image. FIG. 4A and FIG. 4B shown two examples of the input image. The shown image includes a streetscape. The image shown in FIG. 4B includes a texture image. It may be understood that FIG. 4A and FIG. 4B only show two possible examples of the input image. During operations, the input image may include any type of image information. This is not limited in this application.

Still referring to FIG. 3, the context feature determining unit 320 may be configured to determine a context feature of the input image. In some embodiments, the context feature determining unit may be a deep neural network, in this application, the context feature determining unit may alternatively be referred to as a feature extended network, the feature extended network includes a convolutional layer and a pooling layer, and may be configured to perform convolution processing on the input image, and determine the context feature of the input image. For example, the feature extended network may include an encoding unit formed by the convolutional layer and the pooling layer, a dilation unit formed by dilating the convolutional layer, and a decoding unit that is formed by the convolutional layer and the pooling layer and that corresponds to the encoding unit, dilated convolution referring to convolution with a dilation rate being greater than one. The input image is processed by using the feature extended network, and the context feature of the input image may be determined.

In some embodiments, the input image may be directly inputted into the feature extended network, and an output of the feature extended network is used as the context feature of the input image. When the input image is directly processed by using the feature extended network, it may be considered that the context feature outputted by the feature extended network is generated completely based on information about the input image, but does not include any meaningless prior information.

In some other embodiments, an input of the feature extended network may include size information of a target image. In some examples, the input image may be adjusted according to a size of a to-be-inpainted target image and a location of the input image in the target image, then an adjusted input image is inputted into the feature extended network, and an output of the feature extended network is used as the context feature of the input image. For example, if a size of the input image is 64*64 pixels, a size of the target image is 128*128 pixels, and it is known that the input image is located in the center of the target image, the size of the input image may be adjusted to 128*128 by adding pixels. A pixel at a center location of an adjusted input image is a value of the corresponding pixel of the original input image, and the remaining added pixel values may be random values or predefined values such as 0, 1, or any other possible value.

In some embodiments, the pixel value of the input image may be adjusted to −1 to 1 through linear mapping, to reduce the calculation load of the deep neural network.

The feature set determining unit 331 may be configured to determine a first feature set and a second feature set according to the context feature and based on a size of a target image and a location of the input image in the target image, The first feature set may be a set formed by elements in the context feature that correspond to the location of the input image in the target image, and the second feature set may be a set formed by elements in the context feature that correspond to a location of a predicted image in the target image.

In some embodiments, the feature set determining unit 331 may be implemented as a deep neural network. For example, the context feature may be processed by using the deep neural network to obtain a feature set for representing a complete target image, and the first feature set and the second feature set are determined in the processed context feature based on the size of the target image, a size of the input image, the location of the input image in the target image, For example, the feature set determining unit may include an encoding unit formed by a convolutional layer and/or a dilated convolution unit.

In an implementation, if the context feature is determined by directly processing the input image by using the context feature determining unit, a location feature for indicating a region of the predicted image may be determined based on the size of the target image and the location of the input image in the target image, and the location feature and the context feature are combined to obtain a combined context feature. In this case, the feature set determining unit 331 may process the combined context feature by using the deep neural network, and further, the combine context feature may be processed (for example, encoded) by using the feature set determining unit based on the size of the target image and the location of the input image in the target image, to determine the first feature set and the second feature set.

The adjusting unit 332 may be configured to adjust the second feature set according to a first feature statistic of the first feature set. As described above, the first feature set includes the elements corresponding to the location of the input image in the target image, and the second feature set includes the elements corresponding to the location of the predicted image other than the input image in the target image. Therefore, the elements in the first feature set may be used for representing features of the input image in a known region in the target image, and the elements in the second feature set may be used for representing features of the predicted image in an unknown region in the target image. According to the principle of this application, the first feature statistic of the first feature set may be determined, values of the elements in the second feature set may be adjusted according to the first feature statistic, and statistical characteristics of the features in the known region can be transferred to the features in the unknown region, so that content of the finally generated predicted image can exceed one-way constraint of information about a known image closest to the predicted image, and color/texture consistency between the known region and the unknown region is enhanced.

In some embodiments, the first feature statistic may be a statistic of all the elements in the first feature set. At least one of an average value, a standard deviation, a variance of the elements in the first feature set may be used as the first feature statistic. It may be understood that without departing from the principle of this application, a person skilled in the art may arbitrarily select a method for determining the first feature statistic. For example, a statistic such as a sample average value, a sample variance, or a sample range of the first feature set may alternatively be used as the first feature statistic.

In some embodiments, the adjusting unit 332 is further configured to change values of elements in the second feature set, so that a second feature statistic of the adjusted second feature set is the same as the first feature statistic, the second feature statistic being a statistic of the elements in the second feature set. For example, when the first feature statistic is an average value and a standard deviation of the elements in the first feature set, a value of each element in the second feature set may be adjusted based on the following formula to obtain an adjusted second feature set, so that an average value and a standard deviation of elements in the adjusted second feature set are the same as the first feature statistic:

$$AdaIN(x_1, x_2) = \frac{x_1 - \mu(x_1)}{\sigma(x_1)}\sigma(x_2) + \mu(x_2)$$

where $x_1$ represents the second feature set, and $x_2$ represents the first feature set. $\mu(x_2)$ represents the average value of the elements in the first feature set, $\sigma(x_2)$ represents the standard deviation of the elements in the first feature set, $\mu(x_1)$ represents the average value of the elements in the second feature set, and $\sigma(x_1)$ represents the standard deviation of the elements in the second feature set. $AdaIN(x_1, x_2)$ is that values of the elements in the second feature set $x_1$ are adjusted based on a feature statistic of the first feature set $x_2$, so that a feature statistic of the adjusted second feature set is the same as the feature statistic of the first feature set.

Further, the adjusting unit 332 may be further configured to, for each element in the adjusted second feature set, further change a value of each element to a weighted average value of the value of each element in the un adjusted second feature set and the value of each element in the adjusted second feature set. A weight of the value of the un adjusted element and a weight of the value of the adjusted element are not limited in this application. Specifically, a weight of each element in the un adjusted second feature set may be predefined as ρ, a weight of each element in the adjusted second feature set is 1−ρ, and ρ may be any value greater than or equal to 0 and less than or equal to 1. In an example, ρ may be equal to 0.5.

By using the adjusting unit, an adjusted target feature formed by the adjusted second feature set and the first feature set may be represented as:

$$t(f(X),\rho) = [\rho \cdot AdaIN(f(X_\Omega), f(X_{\overline{\Omega}})) + (1-\rho)f(X_\Omega)] \odot M + f(X_{\overline{\Omega}}) \odot (1-M)$$

where $X_{\overline{\Omega}}$ and $X_\Omega$ respectively represent a known region corresponding to the input image and an unknown image region corresponding to the predicted image, f represents the target feature determined by processing the location feature and the context feature that are combined, and ρ is a predefined parameter, which has a value between 0 and 1. M is a mask matrix with a consistent size of f(X), in M, 0 may be used to indicate the known region, and 1 indicates a prediction region. ρ and σ represent a calculated average value and a standard deviation.

The target image generation unit 333 may be configured to generate the target image based on the further adjusted second feature set and the first feature set, the target image being formed by the input image and the predicted image. As described above, the first feature set includes the elements corresponding to the location of the input image in the target image, and the second feature set includes the elements corresponding to the location of the predicted image other than the input image in the target image. Therefore, a feature set of a complete target image may be determined by combining the first feature set and the adjusted second feature set. In some embodiments, the target image generation unit 333 may be implemented as a deep neural network formed by a convolutional layer and a pooling layer, for example, a decoding unit implemented by the convolutional layer. The target feature formed by the adjusted second feature set and the first feature set is processed by using the deep neural network, and a target image including the predicted image may be outputted.

According to the image inpainting apparatus provided in this application, Values of elements in a feature set for representing an unknown region are adjusted by using statistic information of a feature set for representing a known region, and a statistic of the known region can be transferred to the unknown region, so that content of a predicted image generated by using the method according to this application can exceed one-way constraint of information about a known image closest to the predicted image, and color/texture consistency between the known region and the unknown region is enhanced.

In addition, in embodiments consistent with this application, a context feature of a partial image is directly extracted, unnecessary prior information will not be introduced during image inpainting, and the context feature can be determined completely based on information about the inputted partial image. As such the image inpainting apparatus may generate an inpainted image that is more consistent with the inputted partial image in terms of structure, semantics and texture.

FIG. 5 is an structure of a feature extended network according to an embodiment of this application. As shown in FIG. 5, the feature extended network 500 may include an encoding unit 501, a dilation unit 502, and a decoding unit 503. The dilation unit 502 is connected between the encoding unit 501 and the decoding unit 503.

In an embodiment of this application, the encoding unit 501 may include at least one convolutional layer and at least one pooling layer, and is configured to encode an input of the feature extended network. In some embodiments, a size of a feature map outputted by the encoding unit is less than a size of an input image of the feature extended network, and a quantity of channels of the feature map outputted by the encoding unit is greater than a quantity of channels of the input image of the feature extended network.

The dilation unit 502 may be configured to further obtain context information in the feature map. For example, the dilation unit 502 may be implemented as a network structure formed by dilating the convolutional layer. A dilated convolutional layer refers to a convolutional layer with a dilation rate being greater than one. The dilation unit 502 may be configured to further process the feature map outputted by the encoding unit 501, to extract context information in the feature map. In some embodiments, when the feature map outputted by the encoding unit 501 is processed by using the dilation unit 502, a resolution of the feature map is not adjusted. This is because information in the feature map can be obtained in a larger field of view through dilated convolution when a resolution of the feature map remains un adjusted. It may be understood that a person skilled in the art may replace, according to actual needs, the dilated convolutional layer with another structure of a neural network capable of obtaining information about the feature map. A specific form of the dilation unit is not limited in this application.

The decoding unit 503 may include at least one convolutional layer and at least one pooling layer, and is configured to decode an output of the dilation unit 502. In some embodiments, a size of the feature map outputted by the decoding unit is the same as a resolution of a to-be-inpainted target image. The decoding unit 503 may increase a resolution of the feature map through bilinear upsampling. A person skilled in the art may understand that, a resolution of the feature map may alternatively be increased by using another upsampling method.

In some embodiments, the decoding unit may include a feature rearrangement layer. The feature rearrangement layer may be configured to change a resolution of a processed feature map. In an example, an input of the last layer of the decoding unit is a feature map of $h*w*(r_1*r_2*c')$. The feature rearrangement layer may be configured to rearrange the feature map with the size being $h*w*(r_1*r_2*c')$ into a feature map with a size being $r_1h*r_2w*c'$ based on a predetermined mapping relationship. In an example, if the feature rearrangement layer is the last layer of the decoding unit 503, h*w represents a size of an input image of the feature extended network, and $r_1h*r_2w$ represents a size of a to-be-inpainted target image. Such a rearrangement operation s may be defined as:

$$S(F)_{i,j,k} = F_{floor(i/r_1), floor(j/r_2), c'r_2 \bmod(i,r_1) + c' \bmod(j, r_2) + k}$$

where F represents the feature map inputted by the feature rearrangement layer, $r_1$, and c' are predefined parameter values, and i, j, and k are index parameters. floor represents a rounding down operation, and mod represents a modulo operation. That is, a value of an integer part in a result obtained by dividing i by $r_1$ is obtained through floor(i/$r_1$), and a value of an integer part in a result obtained by dividing j by $r_2$ is obtained through floor(j/$r_2$). A remainder obtained by dividing i by $r_1$ is obtained through mod (i, $r_1$), and a remainder obtained by dividing j by $r_2$ is obtained through mod (j, $r_2$).

Elements of the feature map outputted by an intermediate layer of the encoding unit may be rearranged through the rearrangement operation s, and a feature map with the same size as the target image is generated.

In some embodiments, the decoding unit 503 may further include a convolutional layer for performing convolution on the feature rearrangement layer, to better obtain a context feature in a rearranged feature map.

For an output with a size being $r_1h*r_2w*c'$, if a resolution is increased through upsampling, a quantity of channels of the convolutional layer before the upsampling is c', and if the upsampling is replaced by using the feature rearrangement layer, a quantity of channels of the convolutional layer before the feature rearrangement layer is to be set to $r_1*r_2*c'$. Therefore, when a size of a convolution kernel is un adjusted, a quantity of parameters of the convolutional layer can be increased by using the feature rearrangement layer, so that an expression capability of the feature extended network is stronger.

When the context feature determining unit and the context prediction unit shown in FIG. 3 are implemented as a deep neural network, the deep neural network may be trained in the following steps.

A sample image Y is determined from a training sample set, and the training sample set may include image content such as a face, a bird, a texture, or a streetscape. An edge m=(top, left, bottom, right) may be randomly filled in the sample image to determine a partial image as an input of the deep neural network. It is assumed that a target image and the partial image are rectangular, top represents a distance between an upper edge of the partial image and an upper edge of the target image, left represents a distance between a left edge of the partial image and a left edge of the target image, bottom represents a distance between a lower edge of the partial image and a lower edge of the target image, and right represents a distance between a right edge of the partial image and a right edge of the target image.

Subsequently, the partial image may be processed by using the deep neural network, and a target image which is based on the partial image is outputted.

A value of the deep neural network is adjusted, to minimize a loss between the target image and the sample image, and the loss includes at least one of the following:

a pixel difference between the sample image and the target image;

a texture difference between the sample image and the target image; and an adversarial loss between the sample image and the target image.

In this application, the pixel difference between the sample image and the target image may alternatively be referred to as a reconstruction loss function, and the reconstruction loss function may be determined by a relative confidence method. That is, a known region is used as a center, a pixel that is in an unknown region and that is closer to the known region has a highest weight, and a pixel farther from the known region has a lower weight. This is because in an image inpainting process, content of an image that is in the unknown region and that is closer to the known region is more heavily affected by an image in the known region. Therefore, when the reconstruction loss function is determined, a difference between a pixel closer to the known region in the outputted target image and a pixel of a real image is smaller.

In some embodiments, the reconstruction loss function may be represented as:

$$L_s = \|(Y - G(X, m; \theta)) \odot M_w\|_1$$

where Y represents a matrix of a real sample image, G represents an output of the deep neural network, X represents the partial image, m represents a size of an edge, $\theta$ represents a parameter of the deep neural network, and $M_w$ represents a weight matrix. $\odot$ is an operation of multiplying corresponding elements in the matrix. A symbol $\|A\|_1$ represents 1-a norm of a matrix A.

The weight matrix $M_w$ may be represented as:

$$M_w = M_w^{k-1}/\max(M_e^k, \epsilon), \text{ where } M_w^i = (g * \overline{M}^i) \odot M$$

where g is a Gaussian filter, $\overline{M}^i = 1 - M + M_w^{i-1}$ and $M_w^0 = 0$. $M_w^i = (g * \overline{M}^i) \odot M$ is repeated fork times to generate $M_w^k$, k is an index parameter, i represents a sequence number of a current operation, and k is a predefined positive integer. $\epsilon$ is a predefined positive constant, for example, $\epsilon$ may be the negative fourth power of 10. $\epsilon$ is set to prevent a value obtained by performing a division operation from exceeding a preset range when $M_w$ is determined.

The texture difference between the sample image and the target image may be represented by an ID-MRF regularization function, the function is optimized by adjusting a parameter of the deep neural network, a clear texture may be created by narrowing feature distribution of an image G(X, m) outputted by the deep neural network and an original image Y, so that a texture difference between the image G(X, m) outputted by the deep neural network and the original image Y is as small as possible.

Specifically, $\hat{Y}_\Omega$ represents a predicted image in the unknown region, Y represents the sample image, and $\hat{Y}_\Omega^L$ and $Y^L$ represent features extracted from the $L^{th}$ layer of feature map in a predefined image feature extraction network. The predefined image feature extraction network may be a VGG19 network, or may be any other known image feature extraction network. An L layer may be a conv3_2 and/or conv4_2 layer of the VGG19 network, or any other layer.

For image blocks v and s with predefined sizes that are respectively extracted from $\hat{Y}_\Omega^L$ and $Y^L$, a similarity between the two is defined as:

$$RS(v, s) = \exp\left(\left(\frac{\mu(v, s)}{\max_{r \in \rho_s(Y^L)} \mu(v, r) + \epsilon}\right)/h\right)$$

where μ(v, s) calculates a cosine similarity between the two image blocks. r∈ρ$_s$(Y$^L$) represents all image blocks belonging to Y$^L$ other than s. h and ε are two predefined positive constants. Finally, an ID-MRF loss between $\hat{Y}_g^L$ and Y$^L$ is as follows:

$$L_{mrf} = 2L_M(\text{conv4\_2}) + L_M(\text{conv3\_2}), \text{ where}$$

$$L_M(L) = -\log\left(\frac{1}{Z}\sum_{v\in V^L}\max_{v\in V_0^L}\overline{RS}(v, s)\right)$$

where $\overline{RS}(v, s)$ may be calculated through normalization of RS(v, s)/Σ$_{r\in\rho_s(Y^L)}$RS(v, r), and Z is a predefined constant. L represents a quantity of layers of the predefined image feature extraction network.

Compared with a style loss for restoring a texture or style and another loss of a variant of the style loss, the loss function enhances details of the partial image by referencing the most relatively similar image blocks.

The adversarial loss between the sample image and the target image may be determined by using a result outputted by a predefined adversarial network.

Figure 6:
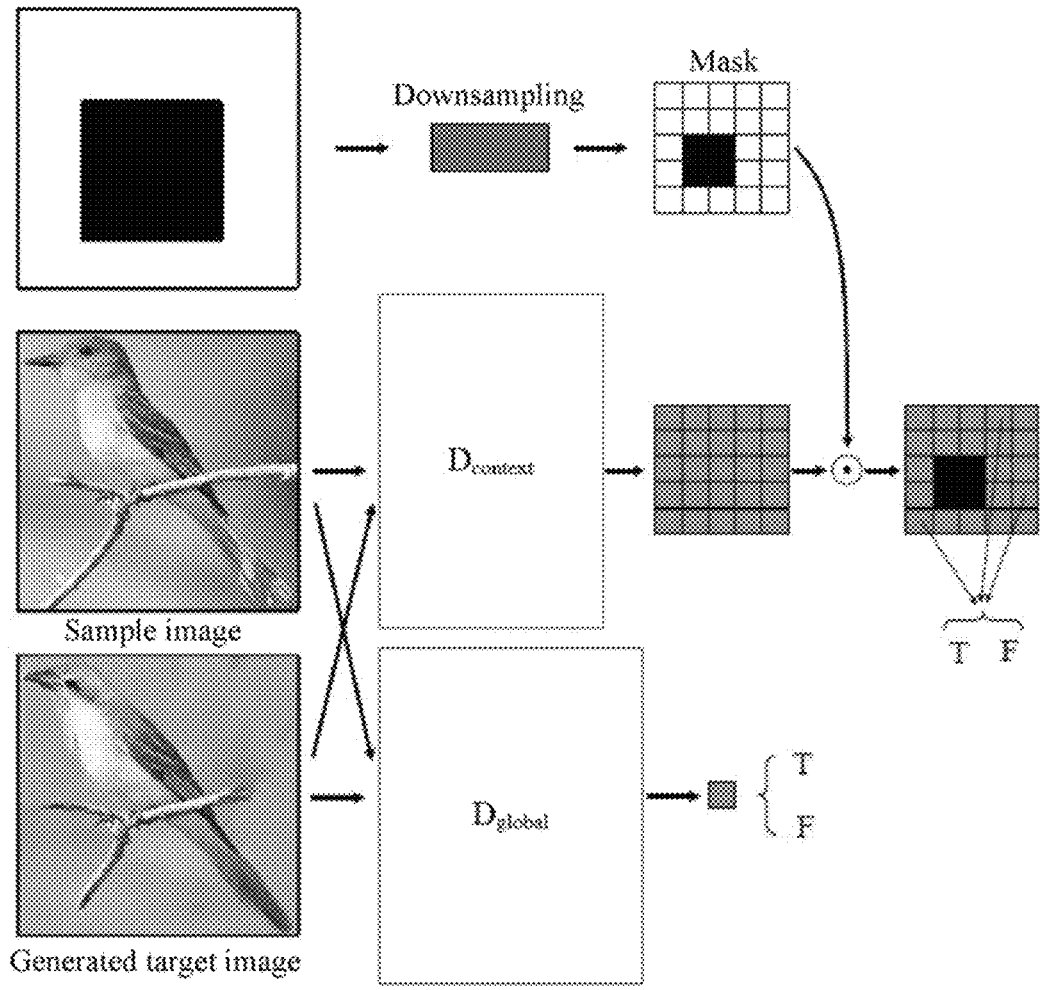
FIG. 6 is an example of determining an adversarial loss of an image outputted by a deep neural network according to this application.

FIG. 6 is an example of determining an adversarial loss of an image outputted by a deep neural network according to this application.

As shown in FIG. 6, According to an embodiment of this application, two predefined adversarial networks for generating the adversarial loss are used, a context adversarial network D$_{context}$ is to identify a part of an unknown region in an image generated by a deep neural network in this application, and a global adversarial network D$_{global}$ is to identify a global image generated by the deep neural network.

Parts that respectively correspond to a known region and an unknown region in a feature map outputted by the context adversarial network D$_{context}$ may be determined based on a size of a sample image and a size of a partial image. Authenticity of each pixel in the unknown region in the feature map may be determined by using the context adversarial network D$_{context}$, and a corresponding real value representing the authenticity is outputted. A first real value of the unknown region may be determined by averaging real values of all pixels in the unknown region.

Global authenticity of an input image may be determined by using the global adversarial network D$_{global}$, and a second real value representing the global authenticity of the image is outputted.

The adversarial loss herein may be defined as:

$$L_{adv}^n = -E_{X\sim\mathbb{P}_X} D(\|\Delta_{\hat{X}}D(\hat{X})\odot M_w\|_2 - 1)^2]$$

where n ∈ {context, global}, when a value of n is a context, L represents the adversarial loss of the unknown region, and when a value of n is global, L represents the adversarial loss of the entire image.

$\hat{X}=tG(X;\theta)+(1-t)Y, t\in [0,1]$, where t is a predefined constant. G represents a trained deep neural network, θ represents a network parameter, and Y represents a sample image. $\Delta_{\hat{X}}D(\hat{X})$ is a derivative operation on D($\hat{X}$) based on $\hat{X}$. $\lambda_{gp}$ is a regular term coefficient. $\mathbb{P}_X$ and $\mathbb{P}_{\hat{X}}$ are respectively distributions of X and $\hat{X}$. $E_{X\sim\mathbb{P}_X}$ represents expectations of all elements X belonging to $P_X$, and $E_{\hat{X}\sim\mathbb{P}_{\hat{X}}}$ represents expectations of all element $\hat{X}$ belonging to $\mathbb{P}_{\hat{X}}$. A symbol $\|A\|_2$ represents 2-a norm of a matrix A.

A final total adversarial loss may be represented as a weighted average value between the adversarial loss of the unknown region and the adversarial loss of the entire image. For example, the total adversarial loss may be represented as:

$$L_{adv}=(L_{adv}^{context}/L_{adv}^{global})/2$$

The pixel difference L$_s$ between the sample image and the target image, the texture difference L$_{mrf}$ between the sample image and the target image, and the adversarial loss L$_{adv}$ between the sample image and the target image may be determined in the foregoing manner. Therefore, a total loss function of the deep neural network to be trained may be represented as:

$$L=\lambda_s L_s+\lambda_{mrf}L_{mrf}+\lambda_{adv}L_{adv}$$

where $\lambda_s$, $\lambda_{mrf}$ and $\lambda_{adv}$ are predefined coefficients. In an example, $\lambda_s$ may be set to 5, $\lambda_s$ may be set to 0.1, $\lambda_{adv}$ may be set to 0.01. The examples of the above parameters do not limit the scope of this application, and a person of ordinary skill in art can adjust respective weights of three sub-loss functions in the total loss function according to specific requirements.

Figure 7:
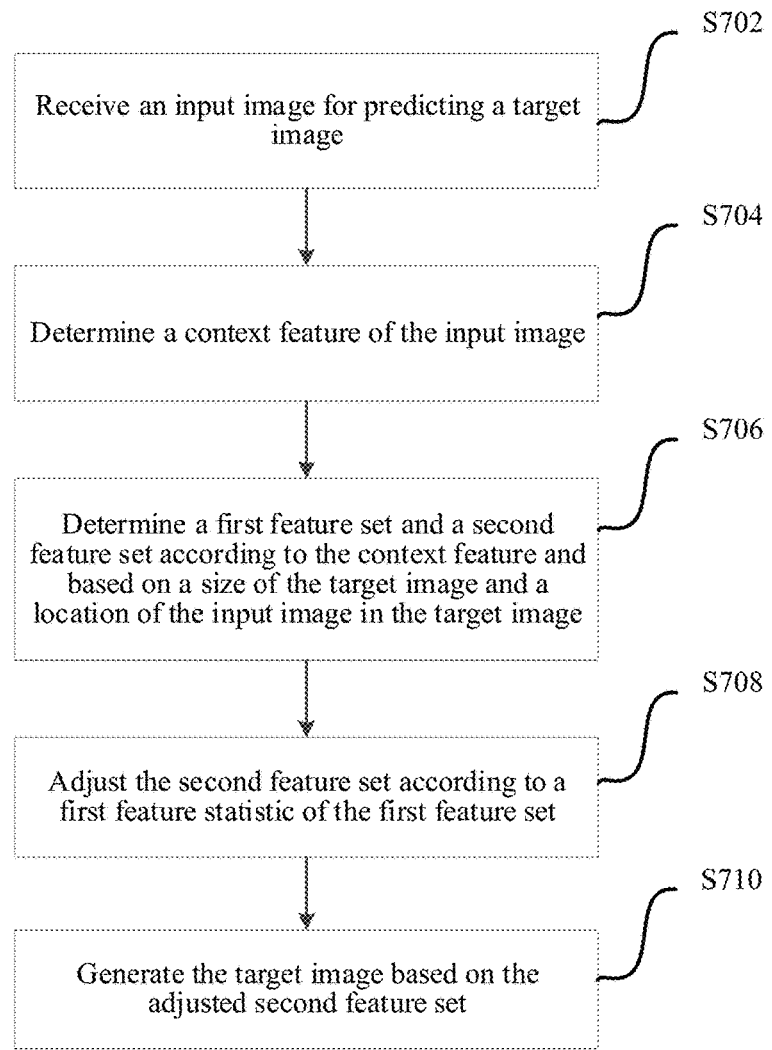
FIG. 7 is a schematic flowchart of an image processing method according to an embodiment of this application.

FIG. 7 is a schematic flowchart of an image processing method according to an embodiment of this application. The method may be performed by a computing device shown in FIG. 9.

In step S702, an input image for predicting a target image may be received, the input image is a partial image of the target image, and the input image may include any type of image information.

In step S704, a context feature of the input image may be determined. In some embodiments, the input image may be processed by using a deep neural network, and the context feature of the input image is determined.

In some embodiments, the input image may be directly processed, and the context feature of the input image is determined. When the input image is directly processed, it may be considered that the context feature determined accordingly is generated completely based on information about the input image, but does not include any meaningless prior information.

In some other embodiments, the input image may be adjusted according to a size of the target image and a location of the input image in the target image, and then the adjusted input image is processed to obtain the context feature of the input image. For example, if a size of the input image is 64*64 pixels, a size of the target image is 128*128 pixels, and it is known that the input image is located in the center of the target image, the size of the input image may be adjusted to 128*128 by adding pixels. A pixel at a center location of an adjusted input image is a value of the corresponding pixel of the original input image, and the remaining added pixel values may be random values or predefined values such as 0, 1, or any other possible value.

In some embodiments, the pixel value of the input image may be adjusted to −1 to 1 through linear mapping, to reduce the calculation load.

In some embodiments, the input image may be encoded, a size of a feature map obtained after encoding may be less than the size of the input image, and a quantity of channels of the feature map obtained after encoding may be greater than a quantity of channels of the input image.

In some embodiments, the encoded input image may be further processed through dilated convolution. Information in the feature map can be obtained in a larger field of view through dilated convolution when a resolution of the feature map remains un adjusted.

In some embodiments, the feature map of the input image obtained after the dilated convolution may be decoded. In some embodiments, a size of the decoded feature map may be the same as a resolution of a to-be-inpainted target image. a resolution of the feature map may be increased through bilinear upsampling. A person skilled in the art may understand that, a resolution of the feature map may alternatively be increased by using another upsampling method.

In some embodiments, a resolution of the feature map may alternatively be adjusted by using the feature rearrangement operation mentioned above, so that a quantity of parameters of a convolutional layer in a network can be increased, and an expression capability of the feature extended network is stronger, Details are not described herein again.

In step S706, a first feature set and a second feature set may be determined according to the context feature and based on a size of a target image and a location of the input image in the target image, The first feature set may be a set formed by elements in the context feature that correspond to the location of the input image in the target image, and the second feature set may be a set formed by elements in the context feature that correspond to a location of a predicted image in the target image.

In some embodiments, the context feature may be processed (for example, encoded) by using the deep neural network to obtain a feature set for representing a complete target image, and the first feature set and the second feature set are determined in the processed context feature based on the size of the target image and the location of the input image in the target image.

In an implementation, if the context feature is determined by directly processing the input image by using the context feature determining unit, a location feature for indicating a region of the predicted image may be determined based on the size of the target image and the location of the input image in the target image, and a size feature of the target image and the context feature are combined to obtain a combined context feature. In this case, the combined context feature may be processed by using the deep neural network, and further, the first feature set and the second feature set may be determined according to the combined context feature and based on the size of the target image and the location of the input image in the target image.

In step S708, the second feature set may be adjusted according to a first feature statistic of the first feature set. As described above, the first feature set includes the elements corresponding to the location of the input image in the target image, and the second feature set includes the elements corresponding to the location of the predicted image other than the input image in the target image. Therefore, the elements in the first feature set may be used for representing features of the input image in a known region in the target image, and the elements in the second feature set may be used for representing features of the predicted image in an unknown region in the target image. According to the principle of this application, the first feature statistic of the first feature set may be determined, values of the elements in the second feature set may be adjusted according to the first feature statistic, and statistical characteristics of the features in the known region can be transferred to the features in the unknown region, so that content of the finally generated predicted image can exceed one-way constraint of information about a known image closest to the predicted image, and color/texture consistency between the known region and the unknown region is enhanced.

In some embodiments, the first feature statistic may be a statistic of all the elements in the first feature set. At least one of an average value, a standard deviation, a variance of the elements in the first feature set may be used as the first feature statistic. It may be understood that, without departing from the principle of this application, a person skilled in the art may arbitrarily select a method for determining the first feature statistic. For example, a statistic such as a sample average value, a sample variance, or a sample range of the first feature set may alternatively be used as the first feature statistic.

In some embodiments, values of elements in the second feature set may be adjusted, so that a second feature statistic of the adjusted second feature set is the same as the first feature statistic, the second feature statistic being a statistic of the elements in the second feature set. For example, when the first feature statistic is an average value and a standard deviation of the elements in the first feature set, a value of each element in the second feature set may be adjusted based on the following formula to obtain an adjusted second feature set, so that an average value and a standard deviation of elements in the adjusted second feature set are the same as the first feature statistic:

$$AdaIN(x_1, x_2) = \frac{x_1 - \mu(x_1)}{\sigma(x_1)} \sigma(x_2) + \mu(x_2)$$

where $x_1$ represents the second feature set, and $x_2$ represents the first feature set. $\mu(x_2)$ represents the average value of the elements in the first feature set, $\sigma(x_2)$ represents the standard deviation of the elements in the first feature set, $\mu(x_1)$ represents the average value of the elements in the second feature set, and $\sigma(x_1)$ represents the standard deviation of the elements in the second feature set. $AdaIN(x_1, x_2)$ is that values of the elements in the second feature set $x_1$ are adjusted based on a feature statistic of the first feature set $x_2$, so that a feature statistic of the adjusted second feature set is the same as the feature statistic of the first feature set.

Further, for each element in the adjusted second feature set, a value of each element may be adjusted into a weighted average value of the value of the each element in the un adjusted second feature set and the value of the each element in the adjusted second feature set, A weight of the value of the un adjusted element and a weight of the value of the adjusted element are not limited in this application. Specifically, a weight of each element in the un adjusted second feature set may be predefined as p, a weight of each element in the adjusted second feature set is 1−ρ, and ρ may be any value greater than or equal to 0 and less than or equal to 1. In an example, ρ may be equal to 0.5.

By using the adjustment step, an adjusted target feature formed by the adjusted second feature set and the first feature set may be represented as:

$$t(f(X),\rho)=[\rho \cdot AdaIN(f(X_\Omega),f(X_{\overline{\Omega}}))+(1-\rho)f(X_\Omega)]\odot M + f(X_{\overline{\Omega}})\odot(1-M)$$

where $X_{\overline{\Omega}}$ and $X_\Omega$ respectively represent a known region corresponding to the input image and an unknown image region corresponding to the predicted image, f represents the target feature determined by processing the location feature and the context feature that are combined, and ρ is a predefined parameter, which has a value between 0 and 1. M is a mask matrix with a consistent size of f(X), in M, 0 may be used to indicate the known region, and 1 indicates a prediction region. μ and σ represent a calculated average value and a standard deviation.

In step S710, the target image may be generated based on the adjusted second feature set, the target image being formed by the input image and the predicted image. In some embodiments, an adjusted target feature formed by the further adjusted second feature set and the first feature set may be decoded, to generate the target image.

As described above, the first feature set includes the elements corresponding to the location of the input image in the target image, and the second feature set includes the elements corresponding to the location of the predicted image other than the input image in the target image. Therefore, a feature set of a complete target image may be determined by combining the first feature set and the adjusted second feature set. In some embodiments, the target feature formed by the adjusted second feature set and the first feature set is processed by using the deep neural network formed by a convolutional layer and a pooling layer, and a target image including the predicted image may be outputted.

According to the image inpainting method provided in this application, values of elements in a feature set for representing an unknown region are adjusted by using statistic information of a feature set for representing a known region, and a statistic of the known region can be transferred to the unknown region, so that content of a predicted image generated by using the method according to this application can exceed one-way constraint of information about a known image closest to the predicted image, and color/texture consistency between the known region and the unknown region is enhanced.

In addition, in embodiments consistent with this application, a context feature of a partial image is directly extracted, unnecessary prior information will not be introduced during image inpainting, and the context feature can be determined completely based on information about the inputted partial image. The image inpainting method consistent with this application may generate an inpainted image that is more consistent with the inputted partial image in terms of structure, semantics and texture.

In some embodiments, the image inpainting method shown in FIG. 7 may be implemented by using the deep neural network. the deep neural network may be trained in the following steps.

A sample image Y is determined from a training sample set, and the training sample set may include image content such as a face, a bird, a texture, or a streetscape. An edge m=(top, left, bottom, right) may be randomly filled in the sample image to determine a partial image as an input of the deep neural network. It is assumed that a target image and the partial image are rectangular, top represents a distance between an upper edge of the partial image and an upper edge of the target image, left represents a distance between a left edge of the partial image and a left edge of the target image, bottom represents a distance between a lower edge of the partial image and a lower edge of the target image, and right represents a distance between a right edge of the partial image and a right edge of the target image.

Subsequently, the partial image may be processed by using the deep neural network, and a target image which is based on the partial image is outputted.

A value of the deep neural network is adjusted, to minimize a loss between the target image and the sample image, and the loss includes at least one of the following:
  a pixel difference between the sample image and the target image;
  a texture difference between the sample image and the target image; and
  an adversarial loss between the sample image and the target image.

Figure 8A:
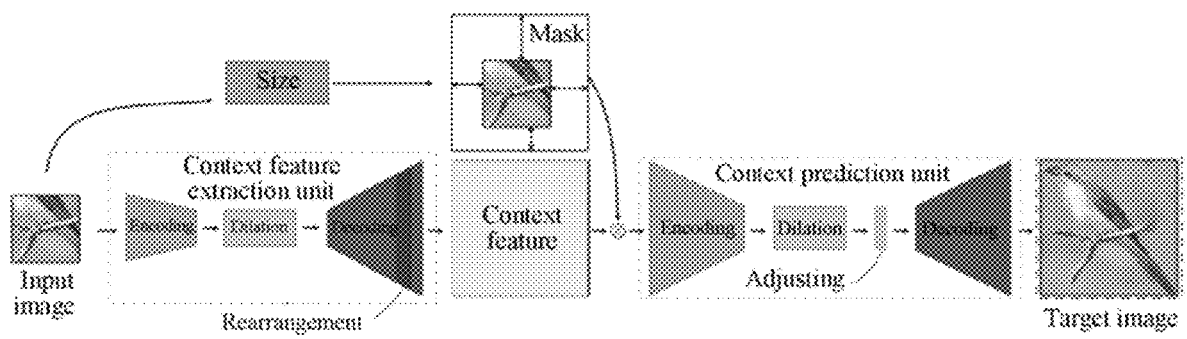
FIG. 8A is a process of image processing according to an embodiment of this application.

FIG. 8A is a method of image processing according to an embodiment of this application.

As shown in FIG. 8A, the image inpainting apparatus includes a context feature determining unit and a context prediction unit. The context feature determining unit and the context prediction unit may be implemented as the context feature determining unit and the context prediction unit shown in FIG. 3 and FIG. 5. A context feature of a partial image may be determined by inputting the partial image to the context feature determining unit, and a size of the context feature may be the same as a size of a to-be-generated target image. Subsequently, a feature map for predicting a target image may be determined by combining the context feature of the partial image and size information of the target image.

For example, a mask M may be generated according to a size of an edge region that needs to be filled between the partial image and the target image, M being the same as the size of the target image, a quantity of channels being 1. In the mask M, a known partial region may be marked as 0, and a to-be-filled edge region may be marked as 1. It may be understood that a person skilled in the art may mark a known region and an unknown region in M in another manner provided that the two different regions can be distinguished.

Then M may be connected to the context feature outputted by the context feature determining unit, that is, M and the context feature are directly combined on a direction of the quantity of channels, and a combined feature is inputted into the context prediction unit.

The combined feature may be processed by using the context prediction unit, to obtain the target image.

Figure 8D:
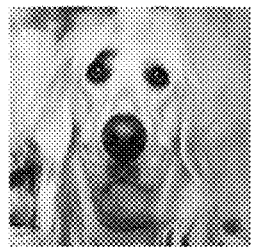
Figure 8D:
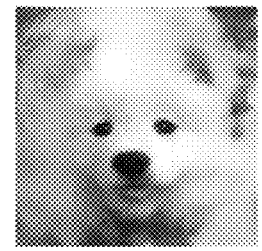
Figure 8D:
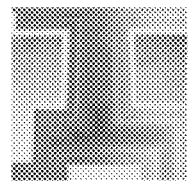
Figure 8D:
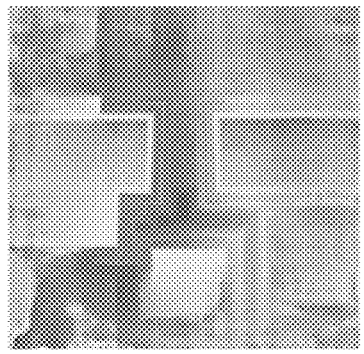
Figure 8D:
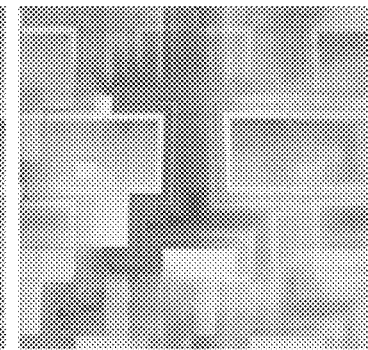
Figure 8E:
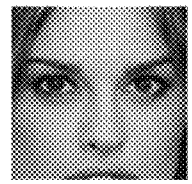
Figure 8E:
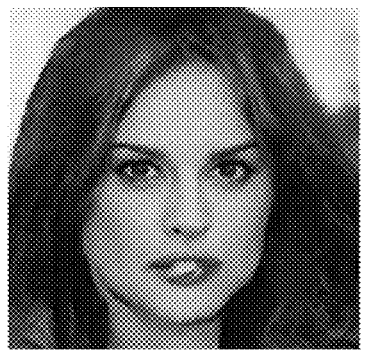
Figure 8E:
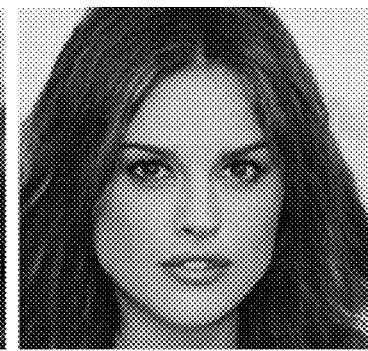
Figure 8F:
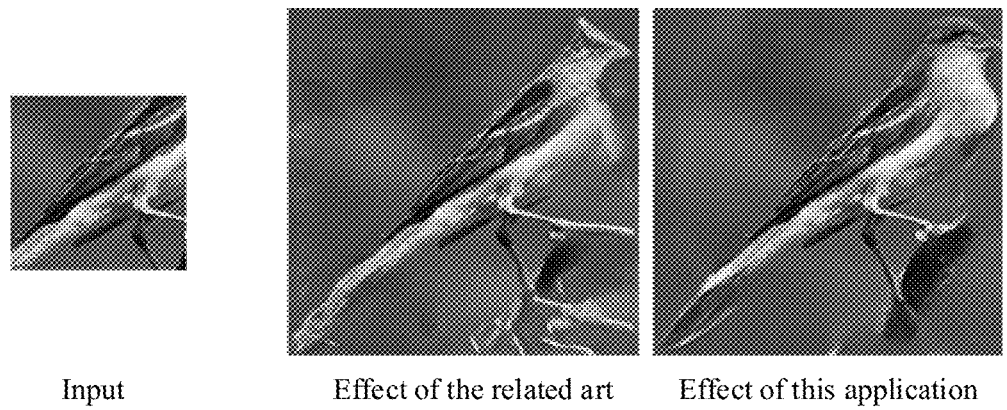
Figure 8G:
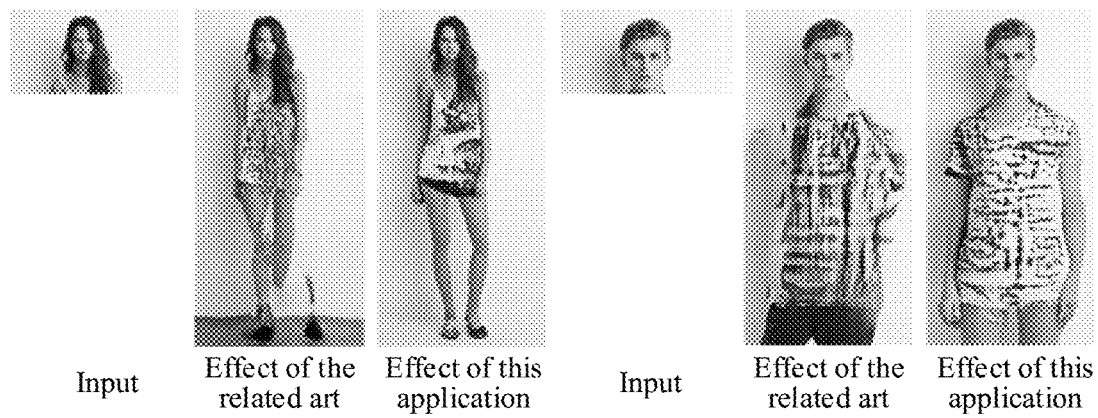
Figure 8H:
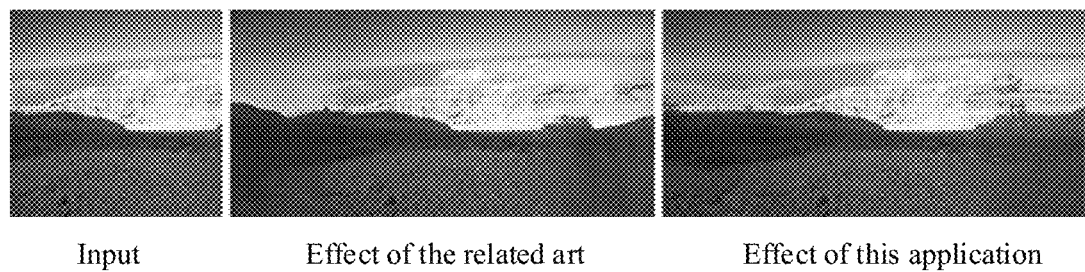
Figure 8I:
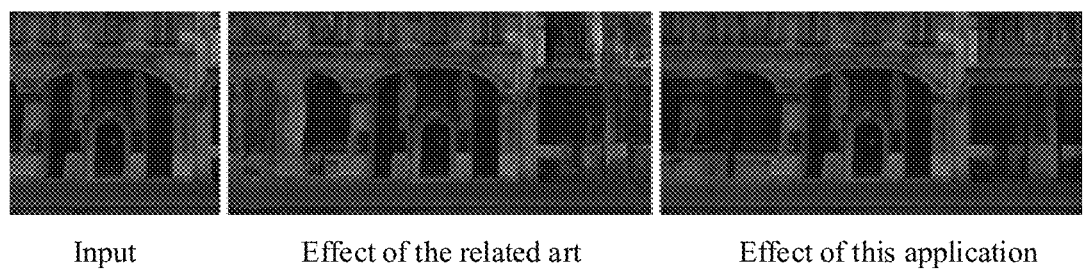
Figure 8J:
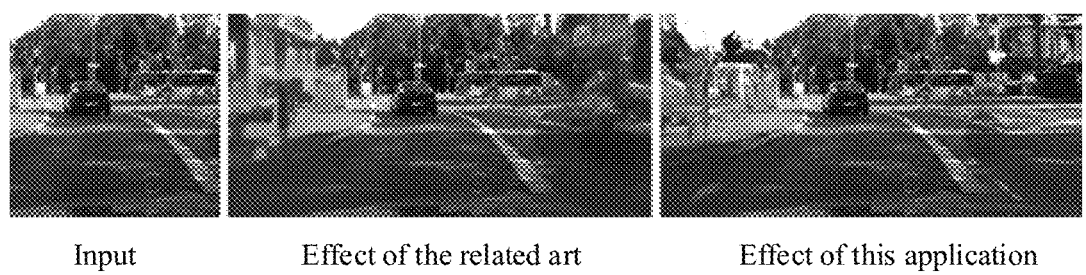

FIG. 8B to FIG. 8J are examples of effect diagrams of an image processing method according to this application. FIG. 8B and FIG. 8C are effect diagrams of generating a complete animal image by using a partial animal face. FIG. 8D is an effect of inpainting a texture image by using an image inpainting method according to this application. It may be learned from that, compared with the prior art, a texture pattern of an inpainted image obtained by using the method of this application is more consistent with a texture pattern of an input image. FIG. 8E to FIG. 8G are effects of inpainting a person and animal by using an image inpainting method according to this application. It may be learned from that, compared with the prior art, person information and animal information in an inpainted image obtained by using the method of this application appear more real without an image effect violating a natural law, FIG. 8H to FIG. 8J are effects of inpainting a landscape by using an image inpainting method according to this application. It may be learned from that, compared with the prior art, landscape information in an inpainted image obtained by using the method of this application has richer content and a better texture effect.

Figure 9:
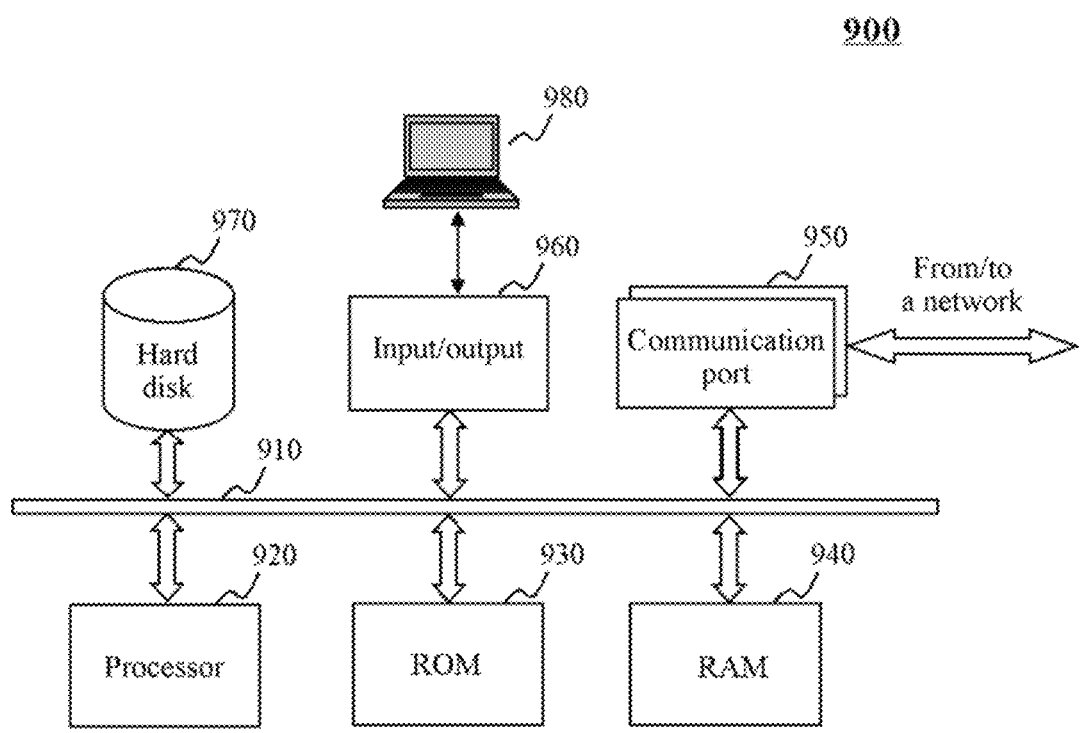
FIG. 9 is an architecture of a computing device according to an embodiment of this application.

In addition, the method or apparatus according to the embodiments of this application may alternatively be implemented by using an architecture of a computing device shown in FIG. 9. FIG. 9 shows an architecture of a computing device. As shown in FIG. 9, the computing device 900 may include a bus 910, one or more CPU 920, a read-only memory (ROM) 930, a random access memory (RAM) 940, a communication port 950 connected to a network, an input/output component 960, a hard disk 970, and the like. The computing device 900 may be installed in the terminal device 110 or the server device 130 shown in FIG. 2A. A storage device, for example, the ROM 930 or the hard disk 970, in the computing device 900 may store various data or files used in processing and/or communication in the image processing method according to this application and program instructions executed by the CPU. The computing device 900 may further include a user interface 980. Certainly, the architecture shown in FIG. 9 is only exemplary, and when different devices are implemented, one or more components in the computing device shown in FIG. 9 may be omitted according to specific requirements.

The embodiments of this application may alternatively be implemented as a computer-readable storage medium. Computer-readable instructions are stored on the computer-readable storage medium according to an embodiment of this application. The computer-readable instructions, when executed by a processor, may perform the method according to the embodiments of this application described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, or a flash memory.

A person skilled in the art can understand that, content disclosed in this application may have various variations and improvements. For example, the devices or components described above may be implemented by using hardware, or may be implemented by using software, firmware, or a combination of some of or all of the software, the firmware, and the hardware.

In addition, as shown in the present application and the claims, words such as "a/an," "one," "one kind," and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In addition, although this application makes various references to some units in the system according to the embodiments of this application, any quantity of different units may be used and run on a client and/or a server device. The units are only illustrative, and different aspects of the system and method may use different units.

In addition, flowcharts are used in this application for illustrating operations performed by the system according to the embodiments of this application. It is to be understood that the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which this application belongs. It is further to be understood that the terms such as those defined in commonly used dictionaries are to be interpreted as having meanings that are consistent with the meanings in the context of the related art, and are not to be interpreted in an idealized or extremely formalized sense, unless expressively so defined herein.

The above is description of this application, and is not to be considered as a limitation to this application. Although several embodiments of this application are described, a person skilled in the art may easily understand that, many changes can be made to the embodiments without departing from novel teaching and advantages of this application. Therefore, the changes are intended to be included within the scope of this application as defined by the claims. It is to be understood that the above is description of this application, and is not to be considered to be limited by the disclosed specific embodiments, and modifications to the disclosed embodiments and other embodiments fall within the scope of the appended claims. This application is subject to the claims and equivalents thereof

What is claimed is:

1. An image processing method, performed by a computing device, the method comprising:
   receiving an input image;
   determining a context feature of the input image;
   determining a first feature set and a second feature set according to the context feature and based on a size of a target image and a location of the input image in the target image;
   adjusting the second feature set according to a first feature statistic of the first feature set, to obtain an adjusted second feature set; and
   generating the target image based on the adjusted second feature set and the first feature set;
   wherein:
      the image processing method is implemented by using a deep neural network, the deep neural network being trained using the following operations:
         determining a sample image from a training sample set, and randomly determining a partial image in the sample image as an input of the deep neural network;
         processing the partial image by using the deep neural network, and outputting a target image based on the partial image; and
         adjusting a value of the deep neural network, to minimize a loss between the target image and the sample image, the loss being determined by a pixel difference between the sample image and the target image based on a matrix of a real sample image, an output of the deep neural network, the input image, a size of an edge, a parameter of the deep neural network, and a weight matrix.

2. The image processing method according to claim 1, wherein the target image is formed by the input image and a predicted image, and
   the determining a first feature set and a second feature set according to the context feature and based on a size of the target image and a location of the input image in the target image comprises:
   determining, based on the size of the target image and the location of the input image in the target image, a location feature indicating a region of the predicted image;

combining the location feature and the context feature, and encoding the combined location feature and the context feature to obtain a target feature; and determining, based on the location of the input image in the target image, an element set in the target feature that corresponds to the location of the input image as the first feature set, and determining an element set in the target feature that corresponds to a location of the predicted image in the target image as the second feature set.

3. The image processing method according to claim 2, wherein the first feature statistic is a statistic of elements in the first feature set.

4. The image processing method according to claim 2, wherein the adjusting the second feature set according to a first feature statistic of the first feature set comprises:

adjusting values of elements in the second feature set, so that a second feature statistic of the adjusted second feature set is the same as the first feature statistic, the second feature statistic being a statistic of the elements in the second feature set.

5. The image processing method according to claim 4, wherein the adjusting the second feature set according to a first feature statistic of the first feature set further comprises:

for each element in the adjusted second feature set, further adjusting a value of each element to a weighted average value of the value of each element in the un-adjusted second feature set and the value of each element in the adjusted second feature set.

6. The image processing method according to claim 5, wherein the generating the target image based on the adjusted second feature set and the first feature set comprises:

decoding an adjusted target feature formed by the further adjusted second feature set and the first feature set, to generate the target image.

7. The image processing method according to claim 1, wherein the loss further comprises a texture difference between the sample image and the target image.

8. The image processing method according to claim 1, wherein the loss further comprises an adversarial loss between the sample image and the target image.

9. An image processing apparatus, comprising a memory and a processor, the memory storing instructions, the instructions, when executed by the processor, causing the processor to:

receive an input image;

determine a context feature of the input image;

determine a first feature set and a second feature set according to the context feature and based on a size of a target image and a location of the input image in the target image;

adjust the second feature set according to a first feature statistic of the first feature set, to obtain an adjusted second feature set; and generate the target image based on the adjusted second feature set and the first feature set;

wherein:

the image processing method is implemented by using a deep neural network, the deep neural network being trained using the following operations:

determining a sample image from a training sample set, and randomly determining a partial image in the sample image as an input of the deep neural network;

processing the partial image by using the deep neural network, and outputting a target image based on the partial image; and adjusting a value of the deep neural network, to minimize a loss between the target image and the sample image, the loss being determined by a pixel difference between the sample image and the target image based on a matrix of a real sample image, an output of the deep neural network, the input image, a size of an edge, a parameter of the deep neural network, and a weight matrix.

10. The image processing apparatus according to claim 9, wherein the target image is formed by the input image and a predicted image, and the processor is further configured to:

determine, based on the size of the target image and the location of the input image in the target image, a location feature indicating a region of the predicted image, combine the location feature and the context feature, and encode the combined location feature and the context feature to obtain a target feature;

determine, based on the location of the input image in the target image, an element set in the target feature that corresponds to the location of the input image as the first feature set, and determine an element set in the target feature that corresponds to a location of the predicted image in the target image as the second feature set; and calculate the loss based on a matrix of a real sample image, an output of the deep neural network, the input image a size of an edge, a parameter of the deep neural network, and a weight matrix, wherein the weight matrix is determined by a Gaussian filter, an index parameter, and a sequence number of a current operation.

11. The image processing apparatus according to claim 10, wherein the first feature statistic is a statistic of elements in the first feature set.

12. The image processing apparatus according to claim 10, wherein the processor is configured to adjust values of elements in the second feature set, so that a second feature statistic of the adjusted second feature set is the same as the first feature statistic, the second feature statistic being a statistic of the elements in the second feature set.

13. The image processing apparatus according to claim 12, wherein the processor is further configured to:

for each element in the adjusted second feature set, further adjust a value of each element to a weighted average value of the value of each element in the un adjusted second feature set and the value of each element in the adjusted second feature set.

14. A non-transitory computer-readable storage medium, storing computer readable instructions, the computer readable instructions, when executed by a processor, causing the processor to perform the image processing method comprising:

receiving an input image;

determining a context feature of the input image;

determining a first feature set and a second feature set according to the context feature and based on a size of a target image and a location of the input image in the target image;

adjusting the second feature set according to a first feature statistic of the first feature set, to obtain an adjusted second feature set; and generating the target image based on the adjusted second feature set and the first feature set, wherein:

the image processing method is implemented by using a deep neural network, the deep neural network being trained using the following operations:

determining a sample image from a training sample set, and randomly determining a partial image in the sample image as an input of the deep neural network;

processing the partial image by using the deep neural network, and outputting a target image based on the partial image; and adjusting a value of the deep neural network, to minimize a loss between the target image and the sample image, wherein:

the loss is determined by a pixel difference, a texture difference, and an adversarial loss between the sample image and the target image.

15. The computer-readable storage medium according to claim 14, wherein the target image is formed by the input image and a predicted image, the determining a first feature set and a second feature set according to the context feature and based on a size of the target image and a location of the input image in the target image comprises:

determining, based on the size of the target image and the location of the input image in the target image, a location feature indicating a region of the predicted image;

combining the location feature and the context feature, and encoding the combined location feature and the context feature to obtain a target feature; and determining, based on the location of the input image in the target image, an element set in the target feature that corresponds to the location of the input image as the first feature set, and determining an element set in the target feature that corresponds to a location of the predicted image in the target image as the second feature set; and a total loss function is determined by the pixel difference between the sample image and the target image, the texture difference between the sample image and the target image, an adversarial loss between the sample image and the target image, and predefined coefficients.

16. The computer-readable storage medium according to claim 15, wherein the first feature statistic is a statistic of elements in the first feature set.

17. The computer-readable storage medium according to claim 15, wherein the adjusting the second feature set according to a first feature statistic of the first feature set comprises:

adjusting values of elements in the second feature set, so that a second feature statistic of the adjusted second feature set is the same as the first feature statistic, the second feature statistic being a statistic of the elements in the second feature set.

18. The computer-readable storage medium according to claim 17, wherein the adjusting the second feature set according to a first feature statistic of the first feature set further comprises:

for each element in the adjusted second feature set, further adjusting a value of each element to a weighted average value of the value of each element in the un-adjusted second feature set and the value of each element in the adjusted second feature set.

19. The computer-readable storage medium according to claim 18, wherein the generating the target image based on the adjusted second feature set and the first feature set comprises:

decoding an adjusted target feature formed by the further adjusted second feature set and the first feature set, to generate the target image.

20. The image processing method according to claim 1, wherein the total loss is determined by the pixel difference between the sample image and the target image, the texture difference between the sample image and the target image, an adversarial loss between the sample image and the target image, and predefined coefficients.

* * * * *